Patented Mar. 29, 1927.

1,622,601

UNITED STATES PATENT OFFICE.

THOMAS W. MILLER, OF ASHLAND, OHIO.

GOLF BALL AND METHOD OF MAKING THE SAME.

No Drawing.    Application filed May 12, 1923. Serial No. 638,667.

My invention relates to golf balls and the method of manufacturing the same, and more particularly to that class of balls wherein a center of any suitable character is wound with rubber thread, under more or less tension, and then provided with the usual external cover of balata or similar material.

Heretofore in the manufacture of balls of this type a suitable center, which may be a solid body or a bag containing a liquid, has been wound with rubber thread under more or less tension, the result being that great care has been necessary in the handling of these wound cores prior to the application of the cover, on account of liability of the thread to become loosened or snapped, thus starting the ball to unravel, in which event the article must be either rewound or scrapped. It is the primary object of my present invention so to treat the wound core that all danger of accidental unwinding will be obviated, while at the same time all the advantages attained by applying the rubber thread under tension will be retained. A further and important object of my invention is to provide a finished article which will not be liable to any distortion while in use, thereby providing a ball truer in flight, as hereinafter more definitely will be set forth.

More specifically, my invention consists in subjecting the wound unfinished ball or core to a thorough permeation of a colloidal material, which will coagulate with the rubber winding into a practically solid mass under tension.

In carrying out my invention a center of any desired character, such as a solid center, or a bag containing a fluid, first is wound in the usual manner under more or less tension as desired until the necessary diameter is obtained. In accomplishing this winding I prefer first to coat the center with rubber latex or some thin sticky solution, whereby the inner end of the thread will be caused to adhere thereto. After this winding operation is completed, the article is subjected to a bath of the colloidal material, to which may be added, if desired, suitable fillers and vulcanizing agents. While I prefer to perform this operation by immersing in a bath, the same may be accomplished by a dipping process or in any other desired manner, as readily will be understood.

While my invention, in its broad aspect, contemplates the use of any suitable colloidal material, I have found that thoroughly satisfactory results are obtained by the use of rubber latex. As is well known, rubber latex is the sap of the rubber tree, and contains usually from twenty to forty per cent of uncoagulated caoutchouc or rubber suspended in water. Now it also is well known that rubber, either vulcanized or unvulcanized, will absorb a certain quantity of water, so that by immersing, dipping or otherwise treating the tightly wound ball body with the rubber in rubber latex, the interstices of the mass of thread under tension gradually are penetrated, which leaves the wound body, after the water has been evaporated, practically a solid mass of rubber under tension. The difference in the characteristics of a wound body permeated, as hereinbefore described, from that of the unpermeated wound body heretofore in use, best will be shown by cutting them in half, when it will be found that the cut threads of the unpermeated body will make a comparatively large mass of loose rubber, whereas with my improved permeated body the halves will draw together, each in a solid mass, much smaller than the mass in position on the center.

As hereinbefore set forth, one important advantage attained by my improved process and article is that the wound body or core when permeated with colloidal material, such as rubber latex, becomes a practically solid mass that can be handled without danger of any unraveling of the threads, and yet will retain all of the resilient advantages which are attained by the winding of the rubber thread thereon under tension. A further and important advantage of my improved construction is that the finished ball will retain its circular contour under all conditions, thus making it a truer ball in flight, because of the fact that the individual threads of the winding are united in a solid mass, and there is no liability of displacement of these threads when the ball is struck with a golf club.

It is well known that after the caoutchouc or rubber in rubber latex once is coagulated in a solid mass it becomes insoluble in water. It also will be appreciated that rubber dissolved in any of the usual solvents, to form a solution thereof, is incapable of use in respect to my present invention, because the solvent would affect injuriously the threads of the rubber winding of the body or core. For these reasons the use of latex has been found to be particularly advantageous, as the water in which it is suspended not only acts to carry the rubber thoroughly into the wound body, but also has no injurious effect whatever upon the thread winding.

Having thus fully described my invention, what I claim as new and desire to secure by Letters Patent, is:—

1. A golf ball, comprising a core embodying rubber thread wound under tension, and a cover, said wound thread portion being permeated with rubber in rubber latex to form a practically solid mass under tension.

2. The method of manufacturing golf balls, which consists in first winding upon a suitable center a rubber thread under tension to form a wound body or core, then subjecting said wound body or core to rubber latex thoroughly to permeate said winding therewith, then evaporating therefrom the water, leaving a practically solid mass under tension, and finally applying thereto a cover.

3. The method of manufacturing golf balls, which consists in first winding upon a suitable center a rubber thread under tension to form a wound body or core, then immersing said wound body or core in a bath of rubber latex thoroughly to permeate said winding therewith, then evaporating therefrom the water, leaving a practically solid mass under tension, and finally applying thereto a cover.

In testimony whereof I hereunto affix my signature.

THOMAS W. MILLER.